(12) United States Patent
Sugnet et al.

(10) Patent No.: US 9,299,091 B1
(45) Date of Patent: *Mar. 29, 2016

(54) AUDIENCE SEGMENT SELECTION

(71) Applicant: Quantcast Corporation, San Francisco, CA (US)

(72) Inventors: Charles Walsh Sugnet, San Francisco, CA (US); Joseph Harlan Shoop, Oakland, CA (US); Paul G. Sutter, Seattle, WA (US); Konrad S. Feldman, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 13/929,149

(22) Filed: Jun. 27, 2013

Related U.S. Application Data

(63) Continuation of application No. 13/615,575, filed on Sep. 13, 2012, now Pat. No. 8,504,905, which is a continuation of application No. 12/498,628, filed on Jul. 7, 2009, now Pat. No. 8,448,057.

(51) Int. Cl.
*G06F 3/00* (2006.01)
*G06Q 30/02* (2012.01)
*G06F 3/0484* (2013.01)

(52) U.S. Cl.
CPC .......... *G06Q 30/0273* (2013.01); *G06F 3/0484* (2013.01)

(58) Field of Classification Search
CPC .............. G06Q 30/02; G06Q 30/0254; G06Q 30/0272; G06Q 30/0251; G06F 3/0484; G06F 17/30017; G06F 17/30864; G06F 3/0482; G06F 9/4443
See application file for complete search history.

(56) References Cited

U.S. PATENT DOCUMENTS

| | | | |
|---|---|---|---|
| 6,839,680 | B1 | 1/2005 | Liu et al. |
| 7,146,329 | B2 | 12/2006 | Conkwright et al. |
| 7,685,191 | B1 | 3/2010 | Zwicky et al. |
| 7,949,565 | B1 | 5/2011 | Eldering et al. |
| 8,438,170 | B2 | 5/2013 | Koran et al. |
| 8,448,057 | B1 | 5/2013 | Sugnet et al. |
| 8,504,575 | B2 | 8/2013 | Koran et al. |
| 2001/0020236 | A1 | 9/2001 | Cannon |
| 2002/0013757 | A1 | 1/2002 | Bykowsky et al. |

(Continued)

OTHER PUBLICATIONS

Archive of "Alexa Web Search—About Alexa," www.alexa.com, Alexa, 24 pages, [Online] [Archived by http://archive.org on Jan. 26, 2005; Retrieved on May 12, 2010] Retrieved from the Internet<URL:http://web.archive.org/web/20050126045240/pages.alexa.com-/company/index.html>.

(Continued)

*Primary Examiner* — Kyle Stork
(74) *Attorney, Agent, or Firm* — Robin W. Reasoner; Renee Jacowitz

(57) ABSTRACT

A user interface for selecting an audience segment from a pool of tracked entities based on an aggregate similarity of the audience segment to an archetypical audience. A graphical representation illustrating a relationship between a composite index for the audience segment and an audience segment size are displayed to the user. User input indicating the archetypical audience and the audience segment is received by a system and the audience segment is assembled. The composite index and the audience segment size associated with the audience segment, are determined and displayed.

19 Claims, 12 Drawing Sheets

(56) References Cited

U.S. PATENT DOCUMENTS

| | | |
|---|---|---|
| 2002/0123988 A1 | 9/2002 | Dean et al. |
| 2003/0074252 A1 | 4/2003 | Chandler-Pepelnjak et al. |
| 2003/0084452 A1 | 5/2003 | Ryan et al. |
| 2003/0101451 A1 | 5/2003 | Bentolila et al. |
| 2003/0171990 A1 | 9/2003 | Rao et al. |
| 2003/0187741 A1 | 10/2003 | Brown et al. |
| 2004/0181554 A1 | 9/2004 | Heckerman et al. |
| 2004/0194128 A1 | 9/2004 | McIntyre et al. |
| 2005/0187818 A1 | 8/2005 | Zito et al. |
| 2005/0246231 A1 | 11/2005 | Shkedi |
| 2006/0026063 A1 | 2/2006 | Collins |
| 2006/0069616 A1 | 3/2006 | Bau |
| 2006/0173828 A1 | 8/2006 | Rosenberg |
| 2006/0242013 A1 | 10/2006 | Agarwal et al. |
| 2006/0282328 A1 | 12/2006 | Gerace et al. |
| 2007/0061211 A1 | 3/2007 | Ramer et al. |
| 2007/0100803 A1 | 5/2007 | Cava |
| 2007/0150348 A1 | 6/2007 | Hussain et al. |
| 2007/0225996 A1 | 9/2007 | Haberman et al. |
| 2007/0239528 A1 | 10/2007 | Xie et al. |
| 2008/0077494 A1 | 3/2008 | Ozveren et al. |
| 2008/0086741 A1 | 4/2008 | Feldman et al. |
| 2008/0103903 A1 | 5/2008 | Flake et al. |
| 2008/0222283 A1 | 9/2008 | Ertugrul et al. |
| 2008/0242279 A1 | 10/2008 | Ramer et al. |
| 2008/0288310 A1 | 11/2008 | Aaltonen et al. |
| 2009/0024554 A1 | 1/2009 | Murdock et al. |
| 2010/0217665 A1 | 8/2010 | Sharma |
| 2011/0295687 A1 | 12/2011 | Bilenko et al. |

OTHER PUBLICATIONS

PCT International Search Report and Written Opinion, PCT Application No. PCT/US07/80858, Feb. 4, 2008, 9 pages.

United States Office Action, U.S. Appl. No. 13/615,575, Jan. 10, 2013, 16 pages.

United States Office Action, U.S. Appl. No. 12/498,628, Aug. 3, 2012, 13 pages.

United States Office Action, U.S. Appl. No. 12/498,628, Jan. 20, 2012, 14 pages.

Animesh, A. et al., "Online Advertisers' Bidding Strategies for Search, Experience, and Credence Goods: An Empirical Investigation," ACM Electronic Commerce, 2005.

Deng, J. et al., "Local Web Advertisement Through Dynamic Active Proxy," IEEE ICME, 2000, pp. 1183-1186.

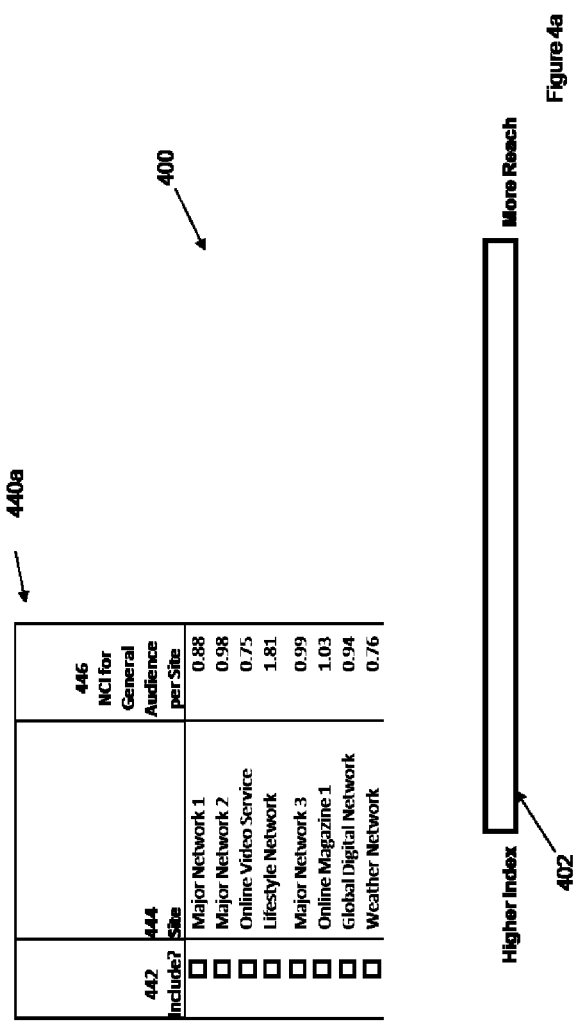

AUDIENCE SEGMENT SELECTION

CROSS-REFERENCE TO RELATED APPLICATIONS

This application is a continuation application of U.S. patent application Ser. No. 13/615,575, filed on Sep. 13, 2012, entitled "Audience Segment Selection," which is a continuation of U.S. patent application Ser. No. 12/498,628, filed on Jul. 7, 2009, entitled "Audience Segment Selection," now U.S. Pat. No. 8,448,057. This application is related to copending application by Feldman et al., entitled "Audience Commonality and Measurement", filed on Apr. 6, 2007, U.S. patent application Ser. No. 11/784,299, which application is hereby incorporated by reference in its entirety, including any appendices and references thereto.

FIELD OF INVENTION

The invention relates to methods and systems for selecting audience segments.

BACKGROUND OF INVENTION

Networked advertisers are interested in targeting audiences. For example, an online advertiser may wish to reach new customers who they hope will have attributes or behaviors similar to a known audience such as the audience of a particular website, the viewers of a selected online video clip, and/or a set of end-users who have made specific online purchases.

What is needed is a system and method for selecting an audience segment based on its aggregate similarity to a known audience.

SUMMARY OF INVENTION

The present invention enables the selection of an audience segment of tracked entities from a pool of tracked entities through an intuitive, graphical interface. A composite index indicates the aggregate similarity between an audience segment and an archetypical audience. In an embodiment, a graphical representation is displayed of the audience segment illustrating the relationship between a composite index for the audience segment and an audience segment size. An audience segment can be indicated with user input via manipulation of the graphical user interface and the composite index and the audience segment size can be automatically calculated and displayed for an audience segment. The composite index and the audience segment size can be automatically re-calculated and re-displayed in response to user input via manipulation of the graphical representations. In some cases, additional data can be displayed, and additional data sensitive to changes in audience segment size and/or composite index can also be re-calculated and re-displayed in response to user adjustments.

BRIEF DESCRIPTION OF DRAWINGS

FIG. 4a illustrates an example of a graphical representation displayed on a device such as a display device;

DETAILED DESCRIPTION OF THE INVENTION

Figure 1:
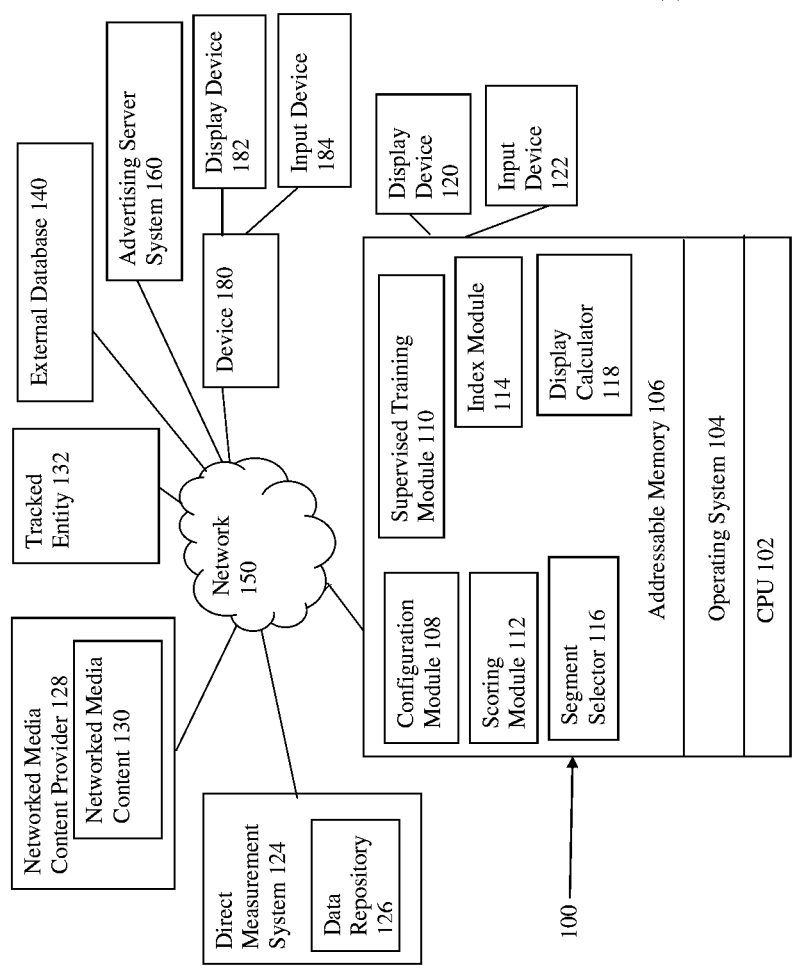
FIG. 1 illustrates an embodiment of a hardware environment for implementing the present invention.

FIG. 1 illustrates an embodiment of a hardware environment for implementing the present invention. As shown in FIG. 1, the hardware environment includes a computer 100, a direct measurement system 124, at least one networked media content provider 128, at least one tracked entity 132, and an advertising server system 160. Optionally, the hardware environment may also include a device 180. These elements of the hardware environment are connected by a communication network 150, such as a local area network, a wide area network, a wireless network, an intranet, or the Internet. Although only one networked media content provider 128 and only one tracked entity 132 are shown in FIG. 1 for clarity, any number of networked media content providers and tracked entities may be connected to the communication network 150.

In one embodiment, the computer 100 includes a Central Processing Unit (CPU) 102, addressable memory 106 an input device 122 such as a mouse, stylus or keyboard, and a display device 120 such as a computer monitor. The computer 100 can be coupled to the communication network 150 and can execute an operating system 104. The computer 100 runs software such as software modules Configuration Module 108, Supervised Training Module 110, Scoring Module 112, Index Module 114, Segment Selector 116 and Display Calculator 118. The computer 100 can be coupled to local and/or remote data repositories such as data repository 126 and external database 140.

Networked Media Content Provider 128 provides networked media content 130 over the communication network 150. Examples of networked media content can include, but are not limited to, a webpage, a portion of an online video clip, a portion of a networked television program, a portion of a cable television program, a portion of a satellite television program, a portion of a an Internet Protocol (IP) television program, a portion of an online audio clip, the results of a keyword search from an online search engine, the results of a request for directions from an online mapping service and interfaces for making online purchases. The networked media content 130 is provided over the communication network 150 such as the Internet, a cellular phone network, a local area network (LAN) a wide area network (WAN), cable network, satellite network and combinations thereof. Examples of networked media content providers 128 can include web site operators and cable television operators. In some examples, the networked media content 130 can be provided based on a request to the networked media content provider 128; in some examples, the networked media content provider 128 can push the networked media content 130.

Advertising Server System 160 serves networked advertisements for delivery in conjunction with networked media content 130 over the communication network 150. For example, an advertising server system can comprise a web server for storing online advertising content and delivering the online advertising content to website visitors. A local advertising server system may only provide services for a single networked media content provider, whereas third-party advertising server systems can provide services in conjunction with multiple networked media content providers.

Tracked entities 132 access networked media content 130 and can receive online advertising content over the communication network 150. Examples of tracked entities 132 can include software installations used to access networked media content and/or hardware devices used to access networked media content. For example, a tracked entity 132 can comprise a software installation such as a web browser instance, video viewer instance or set-top box software residing on a hardware device such as a computer, personal digital assistant (PDA), cell phone or set-top unit (STU) such as a STU used in conjunction with cable television service. In another example, a tracked entity can comprise a hardware device such as a computer, personal digital assistant (PDA), cell phone or set-top unit (STU) such as a STU used in conjunction with cable television service. In some cases, a tracked entity can comprise two or more software installations used to access networked media content and/or hardware devices used to access networked media content which are logically grouped together to represent individuals, households or groups of individuals who access networked media content.

A tracked entity 132 has attributes and attribute values. Attribute values associated with a tracked entity can be collected, cross-referenced, inferred, estimated and/or calculated. For example, attributes and attribute values associated with a tracked entity 132 can be related to networked media content consumption history. In some cases, attributes and attribute values associated with a tracked entity 132 can be the context of networked media content consumption events such as the quality of the consumption event. For example, one or more attribute values can be associated with the hardware and/or software volume settings during the delivery of an audio advertisement. Other attributes values can describe the hardware and/or software configuration associated with the tracked entity or be associated with and/or descriptive of one or more individuals associated with the tracked entity, such as an individual or family group associated with a home personal computer. In some cases, attribute values can be assessed or described using probabilities. For example, an attribute value can reflect that there is a 90% chance that the household income for a family group associated with a tracked entity earns between $75,000 and $100,000 per year.

Direct measurement system 124 tracks entities and attributes associated with the tracked entities and stores info in data repository 126. For example a direct measurement system 124, such as a third party direct measurement system, can collect and track attribute values such as the networked media content consumption history associated with individual Internet browser installations used to browse the Internet. For example, when a tracked entity 132 requests networked media content 130 from a networked media content provider 128, such as a request from a web browser operating on a personal computer to display the content of a web page of an online publisher, the networked media content provider can re-direct the tracked entity 132 to submit a pixel request to the direct measurement system 124. Based on the pixel request, and optional subsequent actions and/or interactions, the direct measurement system can collect information or attribute values from the tracked entity 132 and/or associated with the tracked entity 132. The data collected by the direct measurement system 124 for a pool of tracked entities is stored in a data repository 126, such as a database.

An advertiser may be interested in identifying an audience segment that is similar to a known, archetypical audience such as a popular website. For example, the advertiser may know that an advertising campaign on the popular website is very successful and be interested in identifying a larger or new audience similar to the audience of the popular website. For example, this can be useful when the inventory of the popular website is exhausted, the advertiser is interested in seeking out less expensive and/or alternate venues for their advertisements, or the advertiser would like to extend their unduplicated reach.

For example, an advertiser may be interested in identifying an audience segment that is more (or less) similar to an archetypical audience than the Internet average. In this case, the standard audience should, on the whole, have attribute values that are consistent with the average Internet user. In this example, the aggregate similarity between the standard audience and the archetypical audience can be based on a goodness of fit between a set of attribute values typical for the average Internet user and a set of attribute values representative of a typical tracked entity in the archetypical audience. In some cases, sophisticated models, such as supervised learning models, can be used to score the aggregate similarity between a standard audience and an archetypical audience.

Computer system 100 comprises a configuration module 108. For example, the configuration module 108 is used to select or identify an archetypical audience. For examples providing normalized results, the configuration module 108 is used to select or identify a standard audience. The configuration module 108 can be used to direct the computer system 100 to data repositories where the attribute values associated with tracked entities in an archetypical audience and/or standard audience can be found. For example, the configuration module 108 can be directed to a data repository and provided with the instructions to locate the tracked entities in an archetypical audience by querying the data repository for a specific set of attribute values. Similarly, the configuration module can be provided with the instructions to locate the tracked entities in a standard audience by querying the data repository for a specific set of attribute values. However, in some cases, a standard audience may instead be configured by providing an aggregate profile of attribute values representing the standard audience.

Computer system 100 comprises a supervised training module 110 for creating models using supervised training algorithms to identify, analyze and/or score similarities between one or more tracked entities and the archetypical audience of tracked entities. For example, attributes and attribute values associated with the tracked entities can be used by a supervised learning module to create the models. The models created by the supervised training module 110 can be used to identify, analyze and/or score based on the differences between an archetypical audience and a benchmark audience of tracked entities. By distinguishing over a benchmark audience, the most important similarities can be identified and used. For example, the computer system 100 can be used to select audience segments based in part on the distinguishing features discovered through sales funnel modeling and analysis. For example, an archetypical audience can comprise tracked entities with the attribute of "purchased a book online using a coupon" and the benchmark audience could comprise the tracked entities with the attribute "received the book coupon, but did not purchase". Examples of supervised learning algorithms include Support Vector Machines, Neural Nets, Boosting Algorithms, Generalized Linear Models, Naïve Bayes and/or Decision Trees.

In an example, a model such as a supervised learning model can be constructed based on any set of attributes and attribute values. However, in some cases, the attributes and attribute values used to construct a model can be restricted. For example, to protect privacy, restricted attributes and/or restricted attribute values are identified and excluded when forming a model. For example, restricted attributes and/or restricted attribute values are related to information deemed "sensitive". For example, for a system using an attribute such as networked media content consumption history for constructing models, a restricted attribute value which corresponds to visiting a medical information website may not be included in the data used to form models, whereas an attribute value corresponding to visiting a general news website may be included in the data used to form models.

In another example, privacy can be protected by restricting the attributes and attribute values used to select an archetypical audience, but allowing a model such as a supervised learning model to be constructed based on any set of attributes and attribute values including attributes and/or attribute values deemed "sensitive". For example, to protect privacy, restricted attributes and/or restricted attribute values related to information deemed "sensitive" can be identified and excluded from use when selecting an archetypical audience. For example, for a system using an attribute such as networked media content consumption history for constructing models, a restricted attribute value which corresponds to visiting a medical information website may not be used to select an archetypical audience, whereas an attribute value corresponding to visiting a general news website may be included in the data used to select an archetypical audience.

A benchmark audience is configured through the configuration module 108. For example, the configuration module 108 can be provided with the instructions to locate the tracked entities in a benchmark audience by querying the data repository for a specific set of attribute values. In some cases, a benchmark audience may instead be configured by providing an aggregate profile of attribute values representing the standard audience. In some cases, the benchmark audience and the standard audience comprise the same audience.

Computer system 100 comprises a scoring module 112 for scoring a tracked entity based on its similarity to the archetypical audience. For example, the similarity can be assessed by comparing the attribute values of the tracked entity to the attribute values associated with an aggregate model of the archetypical audience. For example, a model created using the supervised training module 110 can be used to create a score describing the similarity between a tracked entity and the archetypical audience of tracked entities.

Computer system 100 comprises an index module 114 for calculating a composite index, indicating the aggregate similarity between an audience segment of tracked entities and the archetypical audience of tracked entities. In some cases, the composite index such as a normalized composite index is calculated using a standard audience. For example, the normalized composite index indicates the aggregate similarity between the audience segment, as a whole, to the archetypical audience, normalized to a standard audience. This indicates, in a quantitative way, how much the audience segment is more (or less) similar to the archetypical audience than the standard audience. The normalized composite index comprises contributions from the individual score of each tracked entity in the audience segment and the standard audience score. For example, a normalized composite index can be calculated by calculating a summary value for the audience segment, such as an average or median score for the audience segment, and dividing it by a summary value for the standard audience, such as an average or median score for the standard audience.

In some examples, the index module is used to calculate composite indices that are not normalized. For example, a non-normalized composite index may be used instead of a normalized composite index when data associated with standard audiences is expensive, unavailable, poor quality, or incomplete. Furthermore, calculating non-normalized composite indices is computationally less demanding than calculating normalized composite indices. Composite indices are useful for providing relative values. Comparing two or more non-normalized composite indices to each other provides a relative understanding of the aggregate similarity between the audience segments to the archetypical audience.

Computer system 100 comprises a segment selector module 116 for selecting an audience segment of tracked entities based on input provided to the segment selector. In an example embodiment, a segment selector module 116 is provided with a goal for a composite index, such as a goal for a normalized composite index, and selects a set of tracked entities to meet the goal. In some cases, an audience segment size can be provided to an audience segment selector module 116 and the audience segment selector module 116 can select the tracked entities from the set of scored tracked entities to meet the indicated segment size; for example, the scored tracked entities with the highest (or lowest) scores could be selected. In some examples, additional constraints can be applied. For example, constraints can be applied to the audience segment and/or the pool of tracked entities. Examples of constraints can comprise: the maximum number of tracked entities in the audience segment and/or attribute values such as attribute values related to the tracked entities. For example, the constraint can be based on at least on attribute value; the audience segment and/or the pool of tracked entities can be narrowed to include only tracked entities associated with an individual in a specified age group. In some cases, the segment selector module can take the scored tracked entities and sort them by the score to simplify the segment selection process.

Computer system 100 comprises a display calculator 118 for creating graphical representations of information such as the audience segment for display on a device such as an output device or display device. For example, display device 120 is a computer monitor coupled to computer system 100. In an example, the display calculator 118 receives data from audience segment selector module 116, and prepare the data for graphical display. In some cases, the display calculator can receive user input for adjusting the graphical representation and prepare updated graphical representations and/or calculations associated with the audience segment for display on a device such as display device 120. For example, a user input device coupled to computer system 100, such as a mouse or stylus can be used to provide user input by operating a graphical user interface mechanism such as a button or checkbox, displayed on the display device 120.

Figure 2:
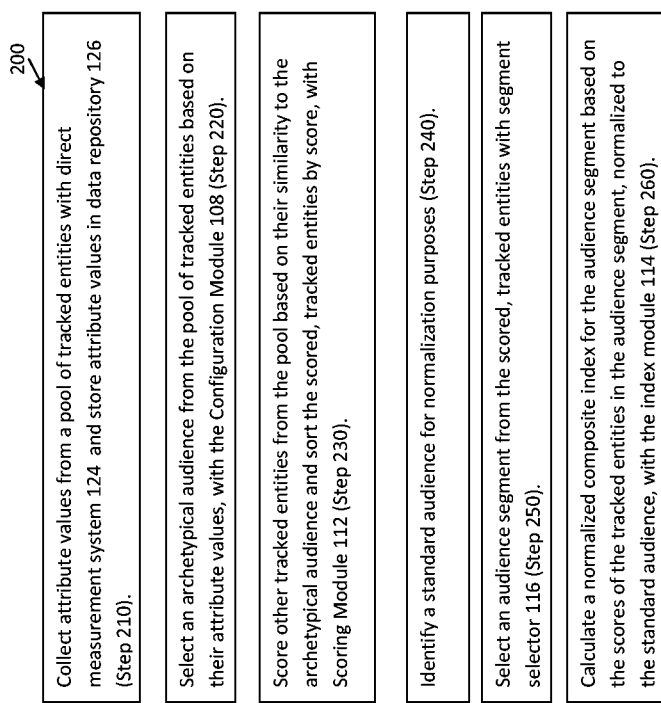
FIG. 2 is a flow chart illustrating an example of a data collection and processing method which can be used in conjunction with the current invention.

The present invention is a graphical, computer-implemented method of selecting an audience segment of tracked entities from a pool of tracked entities based on an aggregate similarity of the audience segment to an archetypical audience. FIG. 2 is a flow chart illustrating an example of a data collection and processing method 200 which can be used in conjunction with the current invention.

Referring to Step 210, tracked entity data is collected. For example, data such as the attribute values of entities in the audiences of networked media content providers can be tracked using a system such as direct measurement system 124. In some cases, attribute values associated with the tracked entities can be estimated, projected and/or inferred from the networked media content consumption history. Examples of attributes related to networked media content consumption history can include: the geographic location and/or time zone of the tracked entity receiving the networked media content, percentage of a video viewed and/or related tracked entity actions.

Attribute values can be stored per tracked entity without using personally identifiable (PII) information. For example, identifiers such as cookies and/or unique identifiers such as locally unique identifiers and/or globally unique identifiers can be used to identify a tracked entity. In some cases, an identifier can be composed and/or stored on a hardware device physically associated with the tracked entity, such as a cell phone or personal computer. In some cases, an identifier can be, partially or wholly, composed and/or stored on a hardware device remote from the tracked entity, such as direct measurement system 124 and/or external database 140. In some cases, attribute values can be collected from registration forms and/or cross-referenced from other sources. Attribute values can include information associated with and/or collected in conjunction with a tracked entity such as hardware, software and/or firmware configurations, networked media content consumption history, characteristics of received networked media content, demographics, geographic location and/or transaction history.

In Step 220, an archetypical audience of tracked entities can be selected based on their attribute values with the configuration module 108. In an example, the audience of a popular website is selected at the configuration module based on their networked media content consumption history; the popular website audience comprises tracked entities with the attribute of having received one or more specific web pages (such as at least one webpage from the domain "www.popularwebsite.com"). In some cases, additional constraints are applied such as selecting the female audience of a popular website. In some examples, the attributes of the audience of a popular website are analyzed, and the archetypical audience is selected based on similarity to the attribute values typical of the tracked entities in the popular website's audience. For example, the archetypical audience of tracked entities can be selected based on a goodness of fit between a profile of attribute values associated with the popular website and the attribute values of the tracked entities. The attribute values of the tracked entities can be collected, inferred, estimated, cross-referenced, calculated and/or identified in a variety of ways.

In Step 230, individual tracked entities are scored based on their similarity to the archetypical audience at the scoring module 112. For example, the similarity can be assessed by the scoring module 112 by comparing the attribute values of the tracked entity to the attribute values associated with an aggregate model of the archetypical audience. In some cases, tracked entities with scores are sorted. For example, the tracked entities can be sorted by score value and/or one or more additional criteria. Sorting tracked entities can simplify subsequent steps such as assembling an audience segment at a segment selector module.

In Step 240, a standard audience is identified for normalization purposes, through the configuration module 108. For example, the configuration module 108 can be used to identify or configure a standard audience. A standard audience score indicates the aggregate similarity between the standard audience and the archetypical audience. A variety of standard audiences may be of interest such as, but not limited to, the US Internet audience and/or the female Internet audience. Normalization to the Internet average audience provides indices used to determine if the archetypical audience of tracked entities is more or less likely than the average Internet user to visit a particular Internet website. The standard audience can comprise tracked entities, with attributes, attribute values and/or scores established per tracked entity, in an example, the standard audience score comprises contributions from every tracked entity in the standard audience. However, in some cases, the standard audience score can be calculated from other sources and/or in other ways. For example, US census data can be used to provide estimates for the attribute values of the US Internet audience; in an example, these attribute values are used to calculate a standard audience score for the US Internet audience.

In Step 250, an audience segment of the scored, tracked entities is selected. In an example, the segment selector module 116 selects an audience segment based at least in part on a goal for a composite index. For example, when assembling an audience segment for high aggregate similarity with the archetypical audience, the entities with scores which correspond to the highest similarity to the archetypical audience can be included in the audience segment first; entities with scores indicating poorer matches can be added until the goal value for the composite index is approached. In this way, the largest audience segment meeting the goal value can be assembled. Similarly, when assembling an audience segment for low aggregate similarity with the archetypical audience, the entities with scores which correspond to the lowest similarity to the archetypical audience can be included in the audience segment first; entities with scores indicating better matches can be added until the goal value for the composite index is approached. In this way, the largest audience segment meeting the goal value can be assembled.

In another example, an audience segment is selected by the segment selector module 116 from the scored tracked entities based at least in part on a goal value for the size of the audience segment. In an example, an audience segment of a specific size is assembled by selecting the tracked, scored entities with scores which correspond to the highest similarity to the archetypical audience first; entities with scores indicating poorer matches can be added until the audience segment size reaches the goal value. In this way, a high aggregate similarity audience segment is assembled. A low aggregate similarity audience segment can be selected by selecting the tracked, scored entities with scores which correspond to the lowest similarity to the archetypical audience first; entities with scores indicating better matches can be added until the audience segment size reaches the goal value.

In an example, additional constraints can be applied in Step 250. For example, an audience segment can be selected based on the size of the audience segment or a goal for a composite index with the additional constraint that tracked entities in the audience segment be associated with specific attribute values. For example, the audience segment can be constrained to comprise tracked entities associated with households having children under the age of five.

In Step 260, a composite index can be calculated for the audience segment of tracked entities at the index module. In some cases, the composite index such as a normalized composite index can be calculated using the standard audience identified in Step 240.

The composite index of an audience segment and the audience segment size have interrelated values. For example, an advertiser could select an audience segment, having an associated composite index such as a normalized composite index, and an audience segment size indicating the number of tracked entities in the audience segment. Alternately, a goal such as a goal for a normalized composite index can be selected, and an attempt can be made to select an audience segment, such as the audience segment with the maximum audience segment size from the multiplicity of tracked entities meeting the goal. It would be expected that the maximum number of tracked entities that can be selected to meet a high aggregate similarity goal would be low; only a few tracked entities in the multiplicity can meet a high standard. Similarly, for a goal indicating a lower standard of aggregate similarity, it would be expected that the maximum number of tracked entities that can be selected to meet the lower aggregate similarity goal would be higher. An advertiser attempting to identify an audience segment could make a trade-off between the degree of aggregate similarity represented by the goal for the normalized composite index and the number of tracked entities in an audience segment. This trade-off can be referred to as a trade-off between "composition" (degree of similarity) and "reach" (the size of an audience segment).

Figure 3A:
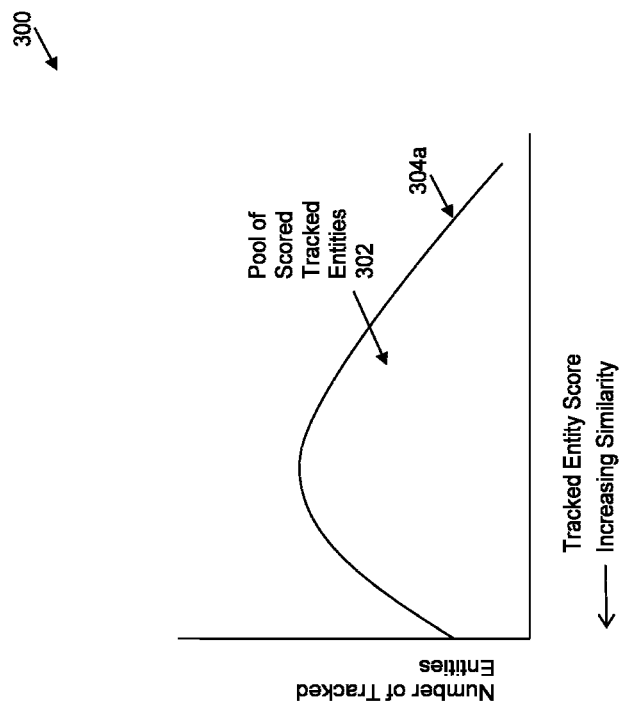
FIG. 3a illustrates an example of a portion of a graphical representation displayed on a device such as display device.

FIG. 3a illustrates an example of a portion of a graphical representation 300 displayed on a device such as display device 120. In this example, an archetypical audience of tracked entities has been selected based on their networked media content consumption history, with all tracked entities in the archetypical audience having received the "Thank you for Purchasing Shoes" web page. A pool of tracked entities 302 have been scored, with the tracked entity score indicating the similarity between the tracked entity and the archetypical audience. The distribution of the tracked entity scores for the pool of tracked entities is shown by the curve 304a, illustrating the relationship between the tracked entities and the similarity between the tracked entities and the archetypical audience.

Figure 3B:
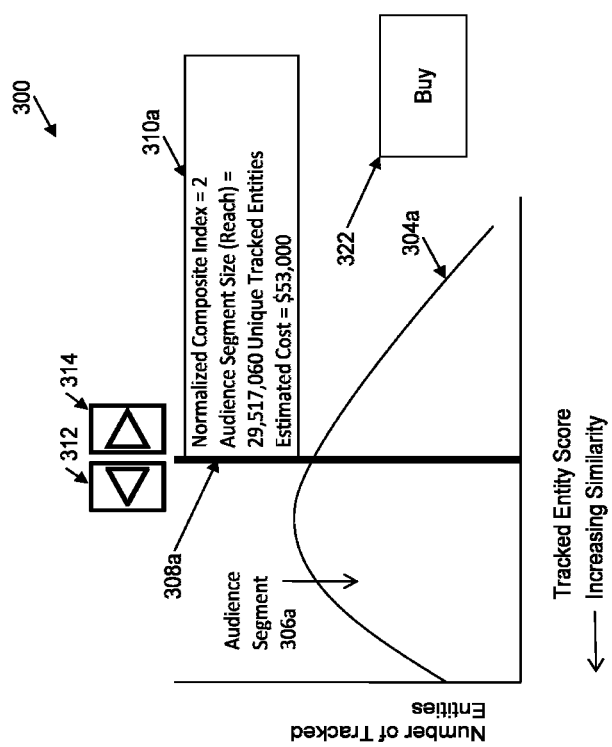
FIG. 3b illustrates an example of a portion of a graphical representation displayed on a device such as display device following the selection of an audience segment of tracked entities from a pool of tracked entities, with the audience segment characterized by a composite index such as a normalized composite index.

FIG. 3b illustrates an example of a portion of a graphical representation 300 displayed on a device such as display device 120 following the selection of an audience segment 306a of tracked entities from a pool of tracked entities, with the audience segment 306a characterized by a composite index such as a normalized composite index. In this example, the normalized composite index is calculated using a standard audience such as the US Internet audience, as characterized in the US Census. In this example, an audience segment with a normalized composite index of "2" would be predicted to be twice as likely to visit the "Thank you for Purchasing Shoes" web page as the standard audience, the US Internet Audience.

A cursor such as bar 308a can be used to designate an audience segment. Referring to FIG. 3b, bar 308a is a user-adjustable limit line, designating the audience segment 306a. In this example, the audience segment is defined by the position of the bar 308a, with all tracked entities to the left of the bar 308a included in the audience segment. Databox 310a displays data such as the normalized composite index, the number of tracked entities in the audience segment selected by bar 308a and the estimated cost to purchase this audience segment; in this example, the number of tracked entities represents the number of unique tracked entities or reach of the audience segment. When an adjustment user input, such as moving the cursor (the user-adjustable limit line represented by bar 308a in this example), is received by the computer system 100, data is re-calculated and the adjusted values are displayed in the databox 310b. For example, an input device 122 such as a mouse or pointer can be used to operate graphical user interface adjustment controls such as arrows 312 and/or 314 which can be used to move the bar 308a laterally, thereby providing adjustment user input and/or selection user input for selecting a new audience segment.

Figure 3C:
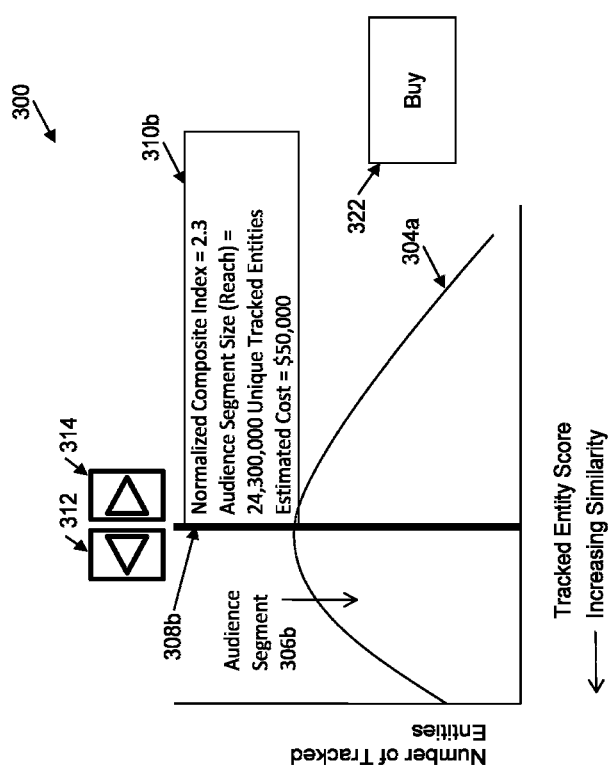
FIG. 3c illustrates a portion a graphical representation displayed on a device such as a display device after the bar has been adjusted to decrease the size of the audience segment.

FIG. 3c illustrates a portion a graphical representation 300 displayed on a device such as display device 120 after the cursor has been adjusted to decrease the size of the audience segment. The normalized composite index, the number of tracked entities in the audience segment selected by bar 308b and the estimated cost to purchase this audience segment have all been re-calculated to reflect the adjusted audience segment and are displayed in databox 310b. In this example, the normalized composite index of 2.3 indicates that the audience segment would be predicted to be 2.3 times as likely to visit the "Thank you for Purchasing Shoes" web page as the standard audience, the US Internet Audience.

Figure 3D:
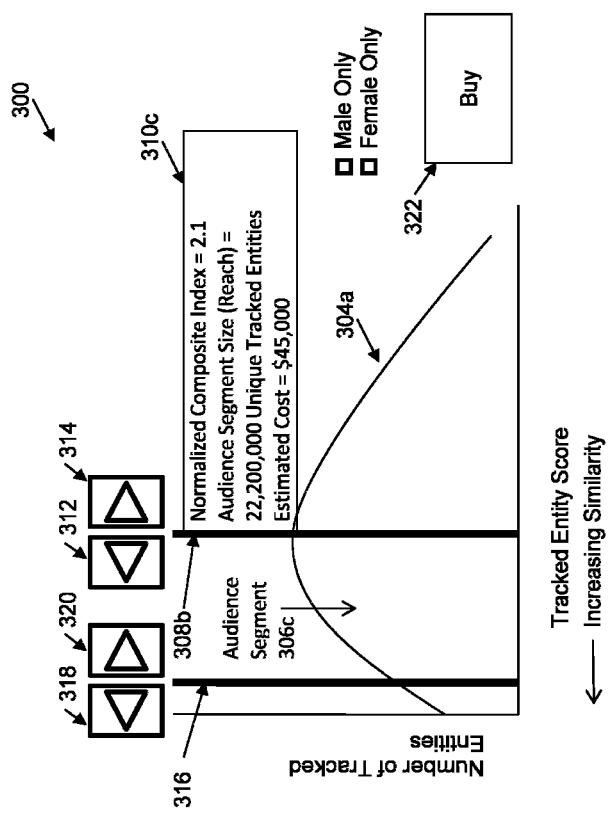
FIG. 3d illustrates a portion of a graphical representation displayed on a device such as a display device after a limit bar has been inserted to adjust the audience segment by decreasing the size of the audience segment.

FIG. 3d illustrates a portion of a graphical representation 300 displayed on a device such as display device 120 after a second cursor, limit bar 316, has been inserted to adjust the audience segment by decreasing the size of the audience segment. In this example, bar 316 and bar 308b define a window indicating the audience segment 306c. The normalized composite index, the number of tracked entities in the audience segment selected by bars 316 and 308b and the estimated cost to purchase this audience segment have all been re-calculated to reflect the adjusted audience segment, and are displayed in databox 310c. In this example, the normalized composite index of 2.1 indicates that the audience segment would be predicted to be 2.1 times as likely to visit the "Thank you for Purchasing Shoes" web page as the standard audience, the US Internet Audience. In this example, the pool of tracked entities shown by the curve 304a can be adjusted using a graphical constraint selection mechanism 324. In this example, the constraint of "male only" or "female only" can be based on the attribute values of the tracked entities in the pool of tracked entities, reducing the number of tracked entities in both the pool of tracked entities and the audience segment. In other examples, the constraint may be applied in a limited range of curve 304a; for example, the constraint can be applied exclusively to the portion of the curve representing the audience segment. Note that in some examples, privacy can be protected by restricting the constraints which can be applied. For example, to protect privacy, constraints related to restricted attributes and/or restricted attribute values related to information deemed "sensitive" can be identified and excluded from use when selecting and/or applying a constraint.

Figure 3E:
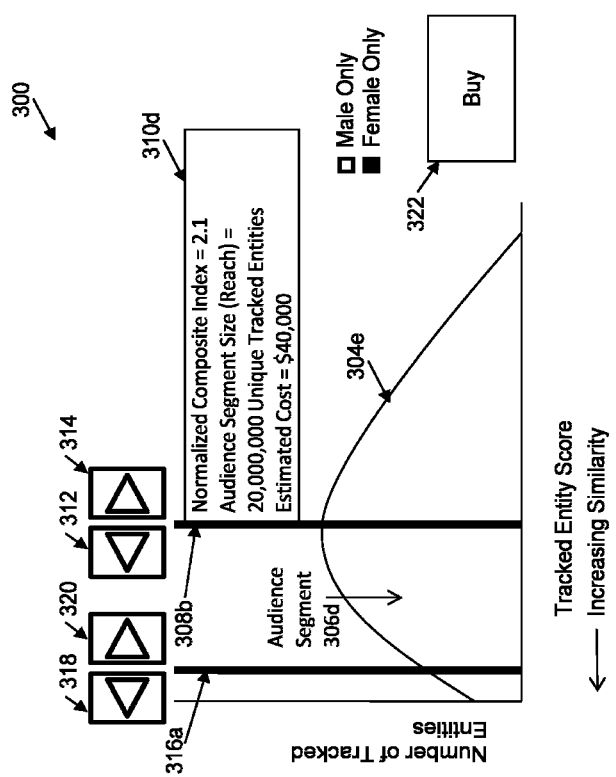
FIG. 3e illustrates a portion of a graphical representation displayed on a device such as a display device after a pool constraint has been selected and applied to the pool of tracked entities, decreasing the size of the audience segment.

FIG. 3e illustrates a portion of a graphical representation 300 displayed on a device such as display device 120 after a pool constraint has been selected and applied to the pool of tracked entities, decreasing the size of the audience segment. In this example, bar 316 and bar 308b define a window indicating the audience segment 306e. Based on the "female only" constraint, only tracked entities with attribute values equal to "female" are included in the pool of tracked entities represented by curve 304b. The normalized composite index, the number of tracked entities in the audience segment selected by bars 316 and 308b and the estimated cost to purchase this audience segment have all been re-calculated to reflect the new audience segment.

Figure 3F:
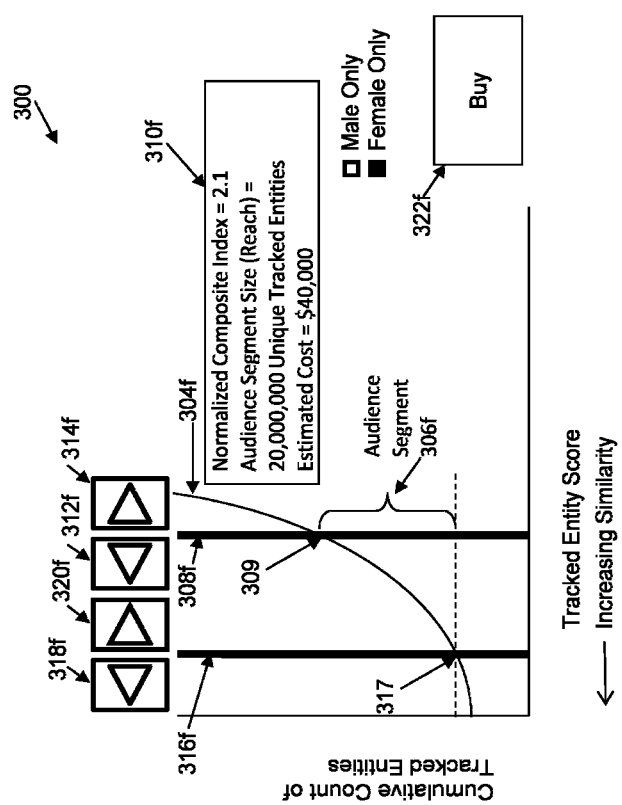
FIG. 3f illustrates another example of a portion of a graphical representation displayed on a device such as display device after a pool constraint has been selected and applied to the pool of tracked entities, decreasing the size of the audience segment.

FIG. 3f illustrates another example of a portion of a graphical representation 300 displayed on a device such as display device 120 after a pool constraint has been selected and applied to the pool of tracked entities, decreasing the size of the audience segment. Similar to the example illustrated in FIG. 3e, bars 316f and bar 308f define a window of tracked entity scores indicating the audience segment 306f and a constraint ("female only") has been applied. The normalized composite index, the number of tracked entities in the audience segment selected by bars 316f and 308f and the estimated cost to purchase this audience segment have all been re-calculated to reflect the new audience segment. However, in this example, the distribution of the tracked entity scores for the pool of tracked entities is a cumulative distribution representing a count of tracked entities at least meeting a tracked entity score limit. In this example, the cumulative distribution for the pool of tracked entities with the constraint applied is shown by the curve 304f, illustrating a cumulative distribution of tracked entities with respect to a similarity between the tracked entities in the pool and the archetypical audience. In this example, the size of the audience segment 306f with the constraint applied is equal to the total number of tracked entities at least meeting the tracked entity score limit (indicated by reference number 309 at the intersection of bar 308f and the curve 304f) minus the total number of tracked entities at least meeting the tracked entity score limit (indicated by reference number 317 at the intersection of bar 316f and the curve 304f.

An advertiser may use a portion of a graphical representation 300 displayed on a device such as display device 120 to select an audience segment for an advertising campaign. In this example, an advertiser may use an input device such as a mouse or stylus to operate a graphical selectable action mechanism for initiating a commercial action such as buy button 322, which can be used to initiate a commercial action such as submitting a purchase request associated with the selected audience segment. In other examples, other commercial actions can be initiated such as, but not limited to, a request for pricing or setting an initial bid for an auction. In other examples, one or more commercial actions can be initiated using graphical selection action mechanisms such as, but not limited to, one or more checkboxes.

FIG. 4a illustrates an example of a graphical representation 400 displayed on a device such as display device 120 including portion 440a. In this example, an archetypical audience of tracked entities will be selected based on their networked media content consumption history, with all tracked entities in the archetypical audience having received the "Thank you for Purchasing Shoes" web page. In this example, portion 440a displays a selectable list of networked media content providers in column 444. The websites in column 444 can be selected for inclusion selection based on selection user input. For example, selection user input can be received when graphical controls such as the check-box controls illustrated in column 442 are operated using a device such as input device 122. In this example, selecting a site means that the audience of tracked entities for that website can be assessed for inclusion in the audience segment. For example, an advertiser may be interested in targeting the audience segment with an advertising campaign. In this case, the advertiser may want to include the audiences of sites where they like to have their advertisements shown.

The graphical representation 400 displayed on a device such as display device 120, illustrated in FIG. 4a is used to select an audience segment from a pool of tracked entities, with the tracked entity score indicating the similarity between the tracked entity and the archetypical audience. The audience segment will be selected based at least in part by selecting a position along bar 402. A position near the "Higher Index" end of bar 402 would lead to the construction of a small audience segment with a very high aggregate similarity to the archetypical audience. A position near the "More Reach" end of bar 402 would lead to the construction of a larger audience segment with a lower aggregate similarity to the archetypical audience.

Figure 4B:
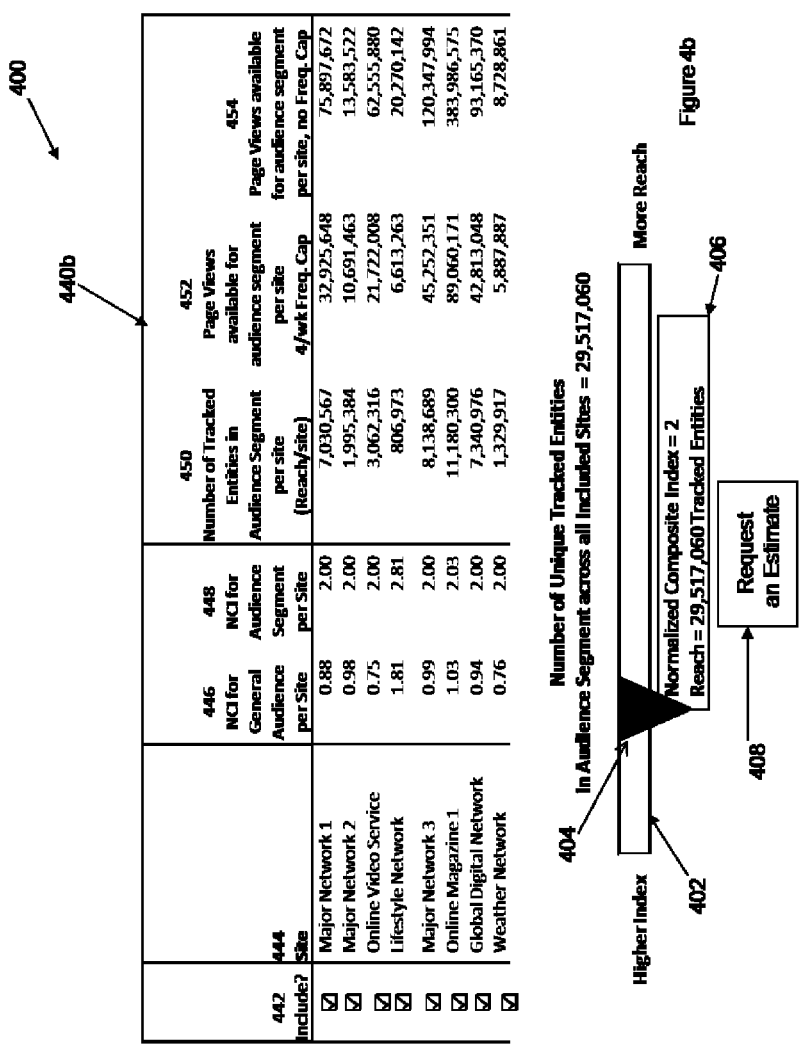
FIG. 4b illustrates an example of a portion of a graphical representation displayed on a device such as a display device following the selection of an audience segment of tracked entities, with the audience segment characterized by a composite index such as a normalized composite index.

FIG. 4b illustrates an example of a portion of a graphical representation 400 displayed on a device such as display device 120 following the selection of an audience segment of tracked entities, with the audience segment characterized by a composite index such as a normalized composite index. A device such as input device 122 can be operated to manipulate user-adjustable slider 404. User-adjustable slider 404 can be positioned along slider bar 402, indicating the audience segment. In this example, databox 406 displays data such as the normalized composite index and reach, or the number of tracked entities, in the audience segment selected by adjustable slider 404. When the user-adjustable slider 404 is moved, indicating an adjustment to the selected audience segment, the data is re-calculated and the adjusted values are displayed in databox 406. For example, an input device 122 such as a mouse can be used to "grab" a graphical user interface adjustment control such as user-adjustable slider 404 and reposition it laterally along the slide bar 402, thereby selecting a new audience segment, resulting in the display of re-calculated, adjusted values for the normalized composite index and the reach in databox 406.

An advertiser may use a graphical representation 400 displayed on a device such as display device 120 to select an audience segment for an advertising campaign. In this example, an advertiser may use a device such as input device 122 to operate a graphical selectable action mechanism such as a "request an estimate" button 408, which can be used to initiate an action such as submitting a request for a price estimate associated with purchasing the selected audience segment. In other examples, other actions can be initiated such as, but not limited to, submitting a purchase request or setting an initial bid for an auction. Examples of input devices can include a mouse, a stylus and/or a rollerball.

Referring to FIG. 4b, portion 440b of a graphical representation 400 displayed on a device such as display device 120 is a table including data related to multiple networked media content providers.

Referring to FIG. 4b. Column 446 is the normalized composite index calculated for the general audience of the site, measured using tracked entities. This indicates the aggregate similarity between the audience of tracked entities who have visited this website and the archetypical audience, normalized to the standard audience. In this case, a value of 0.99 associated with "Major Network 3" means that the general audience of "Major Network 3" is predicted to be slightly less likely than the US Internet average to visit the "Thank you for Purchasing Shoes" website. A value of "1" in this column would indicate that the general audience of "Major Network 3" is predicted to be just as likely as the US Internet average to visit the "Thank you for Purchasing Shoes" website. A value greater than "1" in this column would indicate that the general audience of "Major Network 3" is predicted to be more likely as the US Internet average to visit the "Thank you for Purchasing Shoes" website. The values in this column are static with respect to the position of the user-adjustable slider 404.

Referring to FIG. 4*b*, column 448 is the normalized composite index calculated for the portion of the general audience of the site that overlaps with the audience segment; this value can be dynamic with respect to the position of the user-adjustable slider 404. For example, each time the user-adjustable slider 404 is adjusted, the composition of the audience segment is altered, which can impact the values in this column per site.

Referring to FIG. 4*b*, column 450 is the "number of tracked entities in audience segment per site" or "reach/site". This number represents the number of tracked entities in the general audience of the site that are also included in the audience segment. The values in column 450 are dynamic with respect to the position of the user-adjustable slider 404.

Referring to FIG. 4*b*, column 452 represents the purchasable number of page views which are predicted to be available for delivery during the time interval corresponding to the campaign date, per site, exclusively targeting the tracked entities in the audience segment with a frequency cap of four exposures per week per tracked entity. The values in column 452 are dynamic with respect to the user-adjustable slider 404.

Referring to FIG. 4*b*, column 454 represents the purchasable number of page views which are predicted to be available for delivery during the time interval corresponding to the campaign date, per site, exclusively targeting the tracked entities in the audience segment per tracked entity, with no frequency cap. The values in column 454 are dynamic with respect to the position of the user-adjustable slider 404.

Referring to FIG. 4*b*, a value for the "Number of Unique Tracked Entities in Audience Segment across all Sites" is shown. Note that the number illustrated here (29,517,060) is less than the sum of tracked entities in column 450. This is because, in this example, some overlap exists between the audiences of the included sites. The value of the "Number of Unique Tracked Entities in Audience Segment across all Sites" is dynamic with respect to the position of the user-adjustable slider 404.

Other types of graphical adjustment mechanisms can be used instead of and/or in addition to the user-adjustable slider 404 for indicating and/or adjusting an audience segment such as dials and/or spins. In a simple example, a value for a composite index, normalized composite index and/or segment size can be typed in or selected and related fields can be calculated based on the selection. For example, an advertiser may desire exposures to 1,000,000 tracked entities and wonder what the associated composite index and/or normalized composite index would be for a particular archetypical audience. With a simple interface, the advertiser could type in the number 1,000,000 in a field labeled "number of tracked entities in audience segment" and the other values (such as normalized composite index) would be calculated and presented.

In another example, instead of providing dynamic re-calculation of values as the slider is adjusted, several discrete data points are calculated for a particular set of initial conditions. In an example, an archetypical audience and a standard audience are identified or selected from a drop down menu and five different combinations of "audience segment size" and "normalized composite index" are calculated and presented. In some cases, the audience segment size can be displayed as a number, indicating the exact number of tracked entities in the audience segment. In some cases, the audience segment size can be represented as a range of numbers. In this example, a range of normalized composite indices may be shown and/or an average or representative normalized composite index, corresponding to the range of audience segment sizes.

In some cases, once an audience segment has been selected, it can be used to for targeting such as advertising campaign targeting. For example, when an advertising opportunity associated with a tracked entity becomes available, an advertisement associated with a campaign can be targeted, selected and/or prioritized based on which audience segment includes the tracked entity.

In some cases, the present invention can be used in conjunction with an intention targeting system. For example, the archetypical audience can be a set of tracked entities selected based on their intentions, as identified by an intention targeting system. Identifiers which identify tracked entities in the audience segment can then be sold or auctioned to an interested party.

In some cases, once an audience segment has been selected, it can be used to for targeting of tracked entities which are not necessarily included in the audience segment. For example, an advertiser can select an audience segment and the related composite index through a graphical user interface as exemplified in FIGS. 3 and 4. The audience segment related to the selected value pair can be analyzed and a representative score can be calculated to characterize the set of tracked entities in the audience segment. For example, the representative score could be the score of the average or median tracked entity in the audience segment. As advertising opportunities associated with tracked entities become available, the associated tracked entities can be scored and their scores compared to the representative score before the advertising opportunity is consumed. For example, this technique could be used to select which entities to select for an ad campaign, after the advertising opportunity becomes available. Similarly, this technique can be used in conjunction with intention targeting systems and/or for advertisement pricing and/or prioritization purposes. Using this technique, the tracked entities which are selected, can be selected dynamically and are not necessarily members of the audience segment.

In some cases, the present invention can be used to monitor an advertising campaign in progress. In an example, an advertising campaign is monitored by calculating a normalized composite index for the exposed audience (the audience that has been exposed to the advertising campaign to date), and comparing the normalized composite index for the exposed audience to the goal for the normalized composite index. If the normalized composite index for the exposed audience does not meet the goal, adjustments can be made. For example, a new audience segment can be selected using a normalized composite index which is more selective than the original normalized composite index. Similarly, if the exposed audience exceeds the goal, a new audience segment can be selected using a normalized composite index which is less selective than the original normalized composite index. For examples using representative scores, analogous adjustments to the representative score can be made.

In some cases, the present invention can be used to learn about an audience. For example, a publisher could configure the archetypical audience to correspond to some or all of their networked media content, such as an entire website, a collection of co-owned websites or a portion of a website. By interacting with a graphical representation such as graphical representation 300, a publisher can learn about their audience.

In the previous examples, attributes associated with networked media content consumption history were used to select the archetypical audience, the audience of www.popularwebsite.com. However, a variety of attributes can be used alone or in combination to select the archetypical audience. For example, there are several categories of attributes such as attributes related to networked media content consumption events, attributes related to hardware devices and/or configurations, attributes related to software configurations, attributes related to geographic location, attributes related to individuals, attributes related to demographics, sociographics and/or psychographics, attributes related to off-line events. For example, the archetypical audience could comprise tracked entities having visited at least one website in a category of websites; the category could be "Cooking Enthusiast" and tracked entities which have visited at least one of five different recipe websites frequented by cooking enthusiasts would be included in the archetypical audience.

In some cases, attributes can be obtained, collected, inferred and/or calculated from information stored in external data repositories such as external database 140 and can be provided to the supervised learning algorithm. For example, an external data repository can comprise a loyalty card database tracking offline purchases. Examples of attributes obtained from external data repositories can include, but are not limited to, off-network purchase history, history of non-networked media content consumption such as broadcast television viewing history and/or broadcast satellite television viewing history. A variety of techniques can be used to cross-reference the information in the external data repositories to the tracked entities without maintaining personally identifiable information (Pll) inside the current invention, such as blindfolded record linkage.

In FIG. 1, an embodiment of a hardware environment for implementing the present invention includes a computer 100. However, it is understood that in other examples, a hardware environment for implementing the present invention can comprise a computing cluster, a multiplicity of computers and/or computing devices which can be persistently and/or intermittently networked via one or more wired and/or wireless networks.

Figure 5:
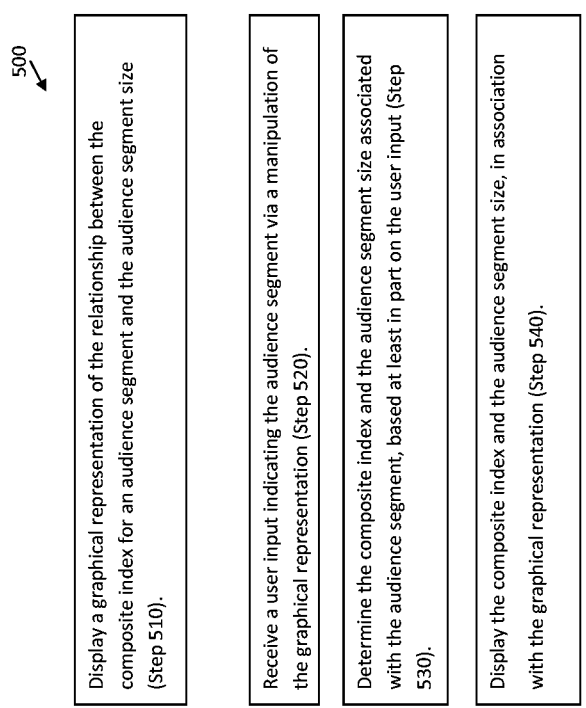
FIG. 5 is a flow chart illustrating an example of a method for selecting an audience segment according to the current invention; and, FIG. 6 is a flow chart illustrating an example of a method for selecting an audience segment according to the current invention.

FIG. 5 is a flow chart illustrating an example of a method 500 for selecting an audience segment according to the current invention. In Step 510, a graphical representation of the relationship between the composite index for the audience segment and the audience segment size is displayed on a display device. In an example, the device is display device 120 or display device 182, such as a computer monitor. An example of a graphical representation of the relationship is shown in FIG. 4b by the position of user-adjustable slider 404 along slider bar 402 and databox 406.

In Step 520, a user input is received, at the computer system, from an input device indicating the audience segment via a manipulation of the graphical representation. In an example, the computer system 100 receives a user input from an input device such as input device 122 or input device 184; the user input manipulates the position of user-adjustable slider 404 along slider bar 402, indicating the audience segment. A variety of mechanisms, such as the slider bar 402 or a continuous dial, can be used to manipulate the graphical representation and can enable a continuous range of selections such as a continuous dial. However, in other examples, a limited number of selections may be enabled, for example, by a mechanism such as, but not limited to, a radio button, a drop down menu, a checkbox, a slider bar with discrete positions and/or a dial with discrete positions.

In Step 530, the composite index and the audience segment size associated with the audience segment are determined at the computer system, based at least in part on the user input. In an example, the computer system 100 and the user input comprises the user input received at computer system 100 in Step 520. For example, the relative position of the user adjustable slider 404 along bar 404 can represent a percentage of the scored, tracked entities; for example a position at the midpoint of bar 402 can represent half of the available scored, tracked entities. In this example, segment selector module 116 is provided with an audience segment size and the audience segment selector module 116 selects the tracked entities from the set of scored tracked entities to meet the indicated segment size; in this example, the scored tracked entities with the highest scores are selected.

In Step 540, the composite index and the audience segment size are displayed on a display device in association with the graphical representation (Step 540). For example, the display device can be display device 120 or display device 182. For example, the composite index and the audience segment size are presented in databox 406 in text form.

Figure 6:
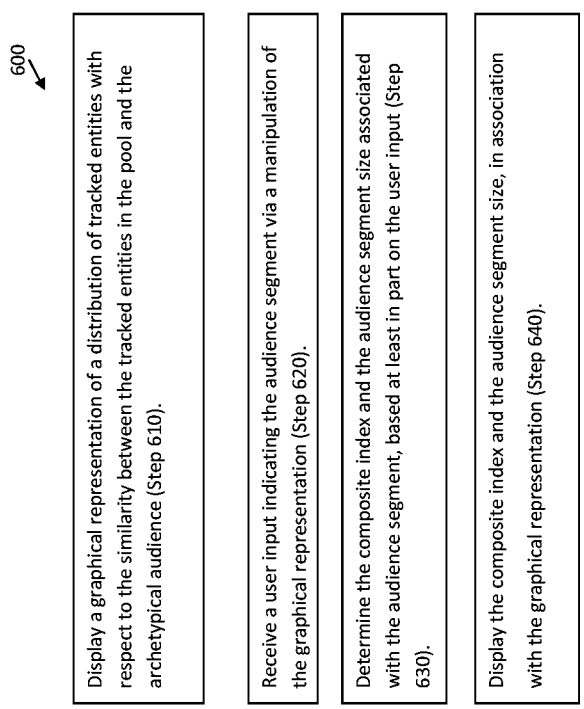

FIG. 6 is a flow chart illustrating an example of a method 600 for selecting an audience segment according to the current invention. In Step 610, a graphical representation of a distribution of tracked entities with respect to a similarity between the tracked entities in the pool and the archetypical audience is displayed on a display device. In an example, the device is display device 120 or display device 182. An example of a graphical representation of a distribution of tracked entities with respect to a similarity between the tracked entities in the pool and the archetypical audience is shown in FIG. 3a by curve 304. An example of a graphical representation of a cumulative distribution of tracked entities with respect to a similarity between the tracked entities in the pool and the archetypical audience is shown in FIG. 3f by curve 304f.

In Step 620 a user input is received from an input device indicating the audience segment via manipulation of the graphical representation. In an example, the computer system 100 receives a user input from a device such as input device 122 or 182. The user input manipulates the position of bar 308a along curve 304, indicating the audience segment with left arrow button 312 and/or right arrow button 314. A variety of mechanisms can be used to manipulate the graphical representation and can enable a continuous range of selections such as a continuous dial. However, in other examples, a limited number of selections may be enabled, for example, by a mechanism such as, but not limited to, a radio button, a drop down menu, a checkbox, a slider bar with discrete positions and/or a dial with discrete positions.

In Step 630, the composite index and the audience segment size associated with the audience segment are determined at the computer system, based at least in part on the user input. In an example, the computer system comprises system 100 and the user input comprises the user input received at system 100 in Step 620. For example, the position of user-adjustable limit line 308a along curve 304 can represent a window of the scored, tracked entities; for example the area under curve 304 can represent the number of tracked entities in the audience segment. In this example, segment selector module 116 is provided with an indication of the audience segment size and the audience segment selector module 116 selects the tracked entities from the set of scored tracked entities to meet the indicated segment size; in this example, the scored tracked entities with the highest scores are selected.

In Step 640, the composite index and the audience segment size are displayed on a display device, in association with the graphical representation. For example, the display device can be display device 120 or display device 182. For example, databox 310*a* presents a composite index (the normalized composite index) and the audience segment size in text form.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method of selecting an audience segment from a pool of tracked entities based on the similarity of the tracked entities to an archetypical audience, the computer-implemented method comprising:
   receiving user input indicating the archetypical audience;
   determining a score for each of a multiplicity of tracked entities, wherein each score comprises an indication of the similarity of the respective tracked entity to the archetypical audience;
   displaying on a device a graphical representation illustrating a distribution of the multiplicity of tracked entities by score;
   receiving a second user input indicating an audience segment via a manipulation of the graphical representation;
   determining an estimated cost of exposing the audience segment to advertising; and
   displaying the value for the estimated cost and the audience segment size in association with the graphical representation.

2. The method of claim 1 wherein:
   receiving a second user input comprises receiving an audience segment size.

3. The method of claim 1 further comprising:
   selecting the archetypical audience from the pool of tracked entities based on the user input.

4. The method of claim 1 wherein:
   the archetypical audience is selected from the group including a website audience and a group of entities which have completed a specific online purchase.

5. The method of claim 1 further comprising:
   receiving an adjustment user input indicating an adjusted audience segment via a manipulation of the graphical representation;
   determining the value for the estimated cost for the adjusted audience segment, based at least in part on the adjustment user input; and
   displaying the value for the estimated cost and the audience segment size in association with the graphical representation, for the adjusted audience segment.

6. The method of claim 1 further comprising:
   displaying a graphical constraint selection mechanism for adjusting the audience segment by applying a constraint based on at least one attribute value to the audience segment;
   receiving an audience segment constraint input indicating the selection of the constraint;
   determining the value for the estimated cost and the audience segment size for the adjusted audience segment, based at least in part on the adjustment user input; and
   displaying the value for the estimated cost and the audience segment size in association with the graphical representation, for the adjusted audience segment.

7. The method of claim 1 further comprising:
   displaying a graphical constraint selection mechanism for adjusting the audience segment by applying a constraint based on at least one attribute value to the pool of tracked entities;
   receiving a pool constraint input indicating the selection of the constraint; and,
   determining the value for the estimated cost and the audience segment size for the adjusted audience segment, based at least in part on the pool constraint input; and
   displaying the value for the estimated cost and the audience segment size in association with the graphical representation, for the adjusted audience segment.

8. The method of claim 1 wherein:
   the audience segment comprises the audience segment predicted to be available for delivery of networked advertisements during a time interval.

9. The method of claim 1 wherein the graphical representation illustrating a distribution of the multiplicity of tracked entities by score illustrates a cumulative count of tracked entities as a function of tracked entity score.

10. A system, comprising:
    a processor, and
    a computer readable storage medium storing processor-executable computer program instructions for selecting an audience segment from a pool of tracked entities based on the similarity of the tracked entities to an archetypical audience, the instructions comprising instructions for:
    receiving user input indicating the archetypical audience;
    determining a score for each of a multiplicity of tracked entities, wherein each score comprises an indication of the similarity of the respective tracked entity to the archetypical audience;
    displaying on a device a graphical representation illustrating a distribution of the multiplicity of tracked entities by score;
    receiving a second user input indicating an audience segment via a manipulation of the graphical representation;
    determining an estimated cost of exposing the audience segment to advertising; and
    displaying the value for the estimated cost and the audience segment size in association with the graphical representation.

11. The system of claim 10 wherein:
    the archetypical audience is selected from the group including a website audience and a group of entities which have completed a specific online purchase.

12. The system of claim 10 wherein the instructions for receiving a second user input comprise receiving an audience segment size.

13. The system of claim 10 wherein:
    receiving an adjustment user input indicating an adjusted audience segment via a manipulation of the graphical representation;

determining the value for the estimated cost for the adjusted audience segment, based at least in part on the adjustment user input; and displaying the value for the estimated cost and the audience segment size in association with the graphical representation, for the adjusted audience segment.

14. The system of claim 10 wherein:

the audience segment comprises the audience segment predicted to be available for delivery of networked advertisements during a time interval.

15. A non-transitory computer readable storage medium executing computer program instructions for selecting an audience segment from a pool of tracked entities based on the similarity of the tracked entities to an archetypical audience, the computer program instructions comprising instructions for:

receiving user input indicating the archetypical audience;

determining a score for each of a multiplicity of tracked entities, wherein each score comprises an indication of the similarity of the respective tracked entity to the archetypical audience;

displaying on a device a graphical representation illustrating a distribution of the multiplicity of tracked entities by score;

receiving a second user input indicating an audience segment via a manipulation of the graphical representation;

determining an estimated cost of exposing the audience segment to advertising; and displaying the value for the estimated cost and the audience segment size in association with the graphical representation.

16. The non-transitory computer readable storage medium of claim 15 wherein the instructions receiving a second user input comprise receiving an audience segment size.

17. The non-transitory computer readable storage medium of claim 15 wherein:

the archetypical audience is selected from the group including a website audience and a group of entities which have completed a specific online purchase.

18. The non-transitory computer readable storage medium of claim 15 wherein the instructions further comprise instructions for:

receiving an adjustment user input indicating an adjusted audience segment via a manipulation of the graphical representation;

determining the value for the estimated cost for the adjusted audience segment, based at least in part on the adjustment user input; and displaying the value for the estimated cost and the audience segment size in association with the graphical representation, for the adjusted audience segment.

19. The non-transitory computer readable storage medium of claim 15 wherein:

the audience segment comprises the audience segment predicted to be available for delivery of networked advertisements during a time interval.

\* \* \* \* \*